Oct. 24, 1967          F. R. WILL          3,348,713
MOTORCYCLE CARRIER
Filed May 24, 1966          2 Sheets-Sheet 1
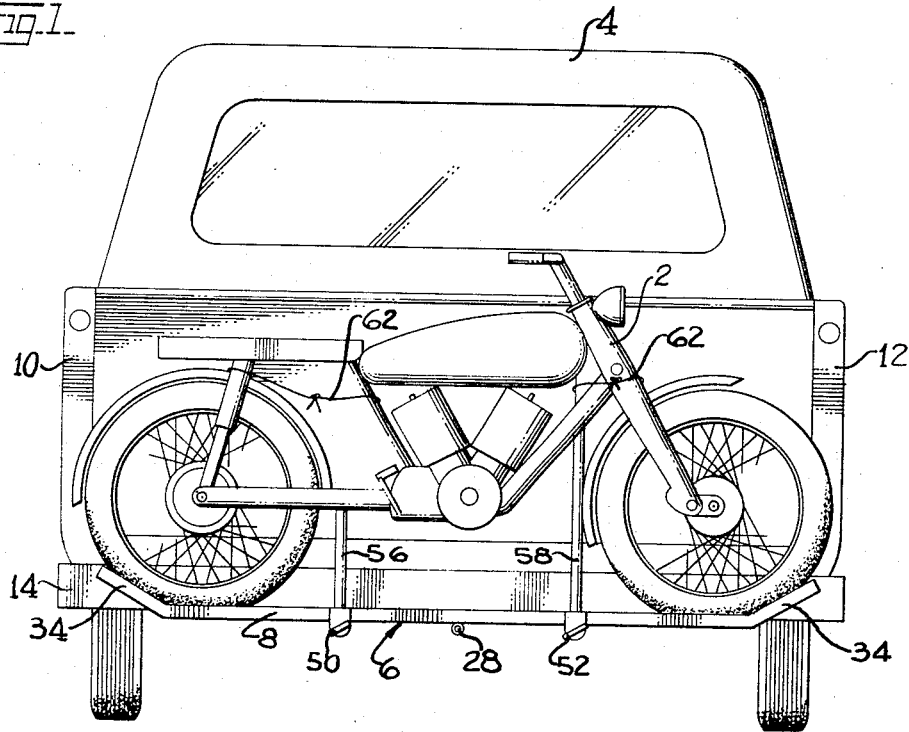
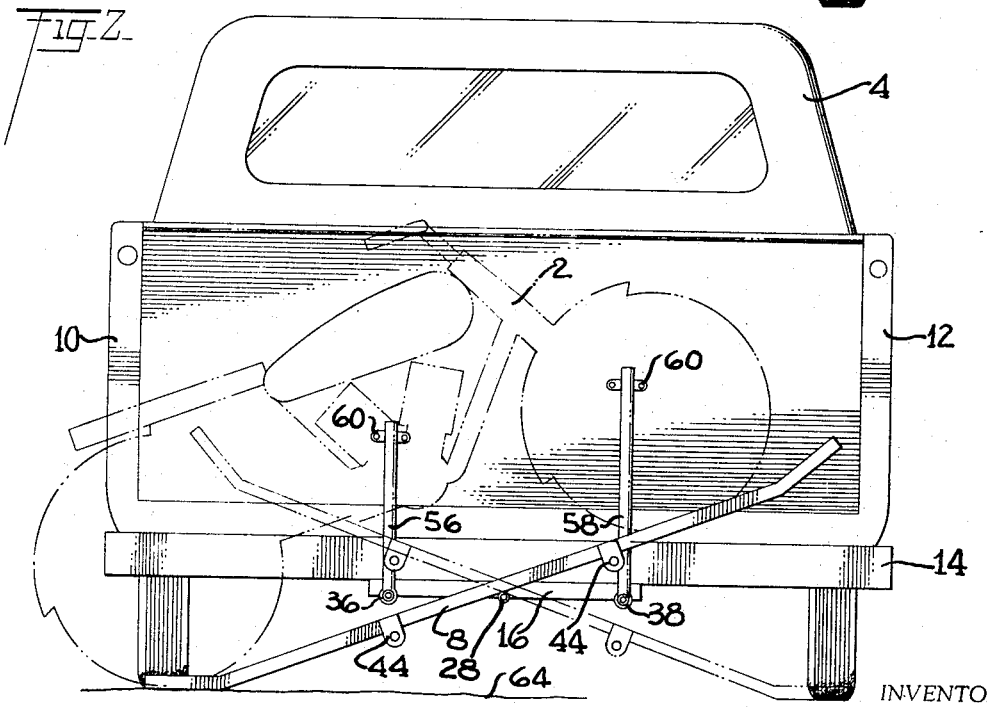
INVENTOR,
FREDERICK R. WILL
BY
FOWLER, KNOBBE
& GAMBRELL
ATTORNEYS.

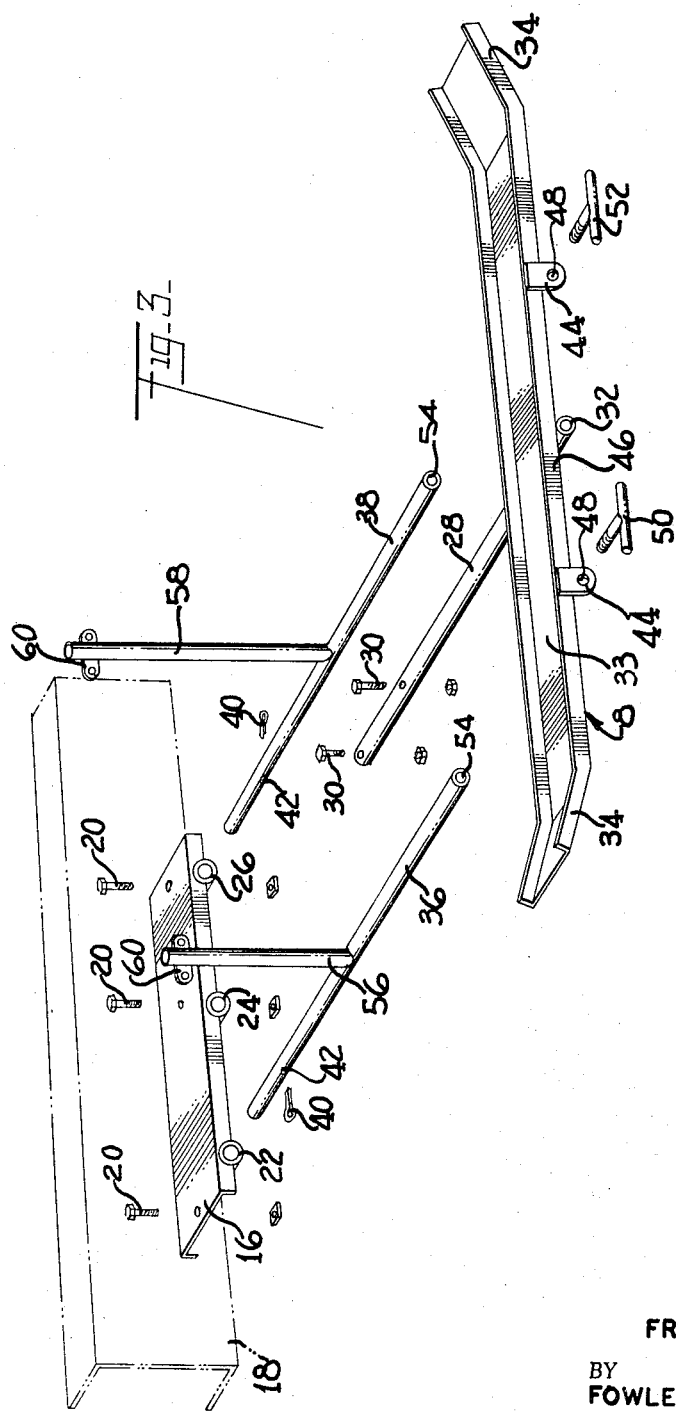

United States Patent Office 3,348,713
Patented Oct. 24, 1967

3,348,713
MOTORCYCLE CARRIER
Frederick R. Will, 12691 Ranchero Way,
Garden Grove, Calif. 92640
Filed May 24, 1966, Ser. No. 552,481
3 Claims. (Cl. 214—450)

ABSTRACT OF THE DISCLOSURE

A cycle carrier is mounted on the end of a vehicle in position to support the cycle transverse to the length of the vehicle. The carrier includes a platform which supports the cycle above the ground in a horizontal position. The platform can be pivoted to incline in either direction to form a ramp for loading and unloading the cycle.

Disclosure

This invention relates to carriers for mounting auxiliary vehicles such as motorcycles on larger vehicles such as automobiles or trucks, and, more particularly, to a carrier which is supported directly from an automobile or truck, rather than on wheels of its own.

Motorcycles, including motor bikes, motor scooters and the like, have become increasingly popular in recent years. In particular, the use of such cycles for hill climbing and trail riding has become a popular pastime of an increasing segment of the population.

Hill climbers and trail riders often prefer to carry their cycle to the climbing or riding area rather than riding it such a long distance. However, motorcycles are generally too large for the trunk of an automobile and too heavy to support on an automobile bumper, so those cyclists who do not have a truck need a trailer or carrier for conveying the cycle.

This invention provides an improved carrier for such a purpose. It is relatively inexpensive to build, easy to install on an auto or truck, and can be readily removed when not in use without harm to the carrier or the vehicle. A carrier constructed in accordance with this invention is lightweight, yet rugged enough to withstand rough use. As the carrier is supported directly from the vehicle rather than on its own wheels like a trailer, it does not substantially interfere with normal driving of the supporting vehicle.

Whether a carrier is used, or a cycle is loaded directly in the bed of a pickup truck, a difficult problem in the transportation of motorcycles is their weight. Most smaller cycles require two strong men to load them onto an elevated platform such as a truck bed or carrier, and two men can hardly handle the larger ones. Accordingly, a design whereby the cycle can be loaded easily on the carrier by a single person without strain is a principal feature of this invention.

Broadly, a cycle carrier constructed in accordance with this invention includes a platform disposed at the rear of the large vehicle and extending transverse to the length of the large vehicle so that the carrier and cycle do not substantially increase the overall length of the vehicle. The platform is supported on the vehicle on a pivotal axis so that it may be moved from a horizontal transporting position to an inclined loading and unloading position in which one end of the platform rests on the ground.

With the platform in the inclined position, the motorcycle may be pushed up the platform, and as the center of gravity of the cycle approaches or crosses the pivot point, the platform is pivoted to the horizontal position where it is stopped. Selectively engageable locking means hold the platform in the horizontal position until it is desired to unload the cycle.

With the platform locked in place, the vehicle may be driven to the unloading location without the special driving problems encountered when pulling a trailer. In order to unload the cycle, the locking means are disengaged, the platform is inclined, and the cycle is rolled off.

It is not always convenient to load and unload the cycle from the same side of the transporting vehicle, particularly in unpaved areas where the vehicle might be parked for a trail ride. In order to accommodate loading and unloading from either side, an examplary embodiment of this invention is constructed so that the platform may be selectively pivoted in either direction to alternate inclined loading or unloading positions. Moreover, this arrangement enables the operator to use the weight of the cycle for pivoting the platform both when loading and unloading.

These and other objects, features and advantages of this invention will be apparent from the following description when read with reference to the accompanying drawings in which:

FIG. 1 is a rear elevation view showing a carrier constructed in accordance with this invention mounted on the rear end of an exemplary truck and supporting an exemplary motorcycle;

FIG. 2 is an elevational view similar to FIG. 1 showing the support platform in one inclined position, and, in phantom, in the opposite inclined position, as well as showing the motorcycle in phantom;

FIG. 3 is an exploded perspective view of the carrier with a portion of the frame of the larger vehicle shown in phantom.

Referring to FIG. 1, a motorcycle 2 is mounted on an exemplary truck 4 by a carrier 6 constructed in accordance with this invention. An elongate platform 8 which forms a part of the carrier 6 supports the cycle 2 closely adjacent the rear of the truck and extends from side 10 to side 12 of the truck. The platform is at approximately the same elevation as the truck bumper 14 to provide sufficient road clearance for normal driving with the cycle loaded on the platform 8.

Referring now to FIG. 3, a structural channel 16 is securely fastened to the underside of a rear transverse structural frame member 18 of the truck by bolts 20. Three parallel sleeves 22, 24 and 25 are welded or otherwise rigidly fixed to the structural channel 16 and extend across the channel generally parallel to the length of the truck.

An elongate cylindrical pipe 28 pivotally inserted in the central sleeve 24 is cantilevered rearwardly to clear the rear end of the truck. This pipe is substantially horizontal and parallel to the length of the truck. A pair of bolts 30 extend through the pipe exterior of the ends of sleeve 24 to position the pipe 28 longitudinally. The distal or rear end 32 of the pipe supports the elongate platform which is welded or otherwise suitably attached to it.

The platform 8 is a relatively shallow upwardly opening channel member 33 of U-shaped cross-sectional configuration with its length disposed generally perpendicular to the cantilevered pipe 28. Upturned end portions 34 on each end of the channel 33 position the cycle on the platform 8 when it is horizontal.

A pair of elongate outer pipes 36, 38 extend rearwardly from the other two sleeves 22, 26 and are substantially coextensive in length with the central support pipe 28. A pin 40 inserted through an aperture (not shown) in each of the outer sleeves 22 and 26 and into an aligned aperture 42 in each outer pipe 36 and 38 fixes the outer pipes 36 and 38 longitudinally and rotationally. When the pins 40 are inserted in the apertures 42, the outer pipes 36 and 38 extend beneath the platform 8 on opposite sides of the pivotal axis of the central pipe 28 to hold the platform in the horizontal position.

A pair of ears 44 depend from the rear flange 46 of the platform, each ear having an aperture 48 aligned with one of the outer pipes 36 and 38. Threaded locking T's 50 and 52 removably inserted through the apertures 48 and into a threaded plug 54 in the rear end of the outer pipes 36 and 38 securely lock the platform 8 in the horizontal position when in place.

A pair of upright pipes 56 and 58 extending from the outer pipes intermediate their ends each have a bracket 60 near their top. Cables or other suitable means 62 (FIG. 1) can be used to tie the motorcycle to the brackets 60 and hold the cycle in the upright position when loaded.

Referring now to FIGS. 1 and 2, if it is desired to load a cycle 2 from the lefthand side 10 of the truck, for example, starting with the platform 8 in the horizontal position, the left locking T 50 is unthreaded from the left pipe 36 and the pin 40 is removed from the left-hand pipe 36. The left pipe 36 is then slid forward through the sleeve 22 until its rear end clears the support platform 8. The right-hand locking T 52 is then removed and the platform 8 is easily pivoted about the central pipe 28 to the inclined position illustrated in FIG. 2. The angle of the upturned portion 34 at the end is selected so that the lower end of the platform rests on the ground surface 64.

The cycle 2 is then rolled up the inclined platform 8. As its center of gravity comes near the pivotal axis 28 at the center of the support platform 8, little lifting effort is required to pivot the platform 8 to the horizontal transporting position. In fact, if the center of gravity crosses the axis 28 the weight of the cycle pivots the platform and eliminates the lifting.

When the platform reaches the horizontal position, the right-hand pipe 38 which is still extended beneath the platform 8 limits further pivotal movement in that direction to position the platform in the horizontal position. The left-hand pipe 36 is then pulled rearwardly beneath the platform 8 to retain it in the horizontal position. As a safety factor, the locking T's 50 and 52 are re-installed, the pin 40 is inserted in the left-hand pipe 36, and the vehicle is tied to the brackets 60 on the upright members 56 and 58.

In order to unload the cycle, it is untied from the brackets 60 and the left-hand locking T 50 is unthreaded. The pin 40 is removed from the left-hand pipe 36 and the pipe 36 is pushed forward to clear the platform. The right-hand T 52 is then removed and the platform 8 is pivoted to the inclined position, whereupon the cycle is rolled off.

If it is desired to load or unload the cycle from the right-hand side 12 of the truck, the right-hand pipe 38 rather than the left-hand one 36 is pushed forward to clear the platform 8 so that the platform pivots to an inclined position in which its right end is adjacent or on the ground (as shown in phantom in FIG. 2).

If the center of gravity of the motorcycle is not midway between its wheels, the carrier constructed in accordance with this invention uses the weight of the cycle to help, rather than hinder, the loading. If, for example, the center of gravity of the cycle is substantially behind its dimensional center, the cycle is backed onto the inclined platform 8 so that its center of gravity will cross the pivotal axis 28 and the weight of the cycle will pivot the platform to the horizontal transporting position. To unload the cycle the platform is inclined in the opposite direction from that in which it was loaded so that the weight of the cycle will cause the platform to incline to the unloading position. Then the cycle is backed off the platform.

Certain modifications of the above-described exemplary embodiment are considered within the teaching of this invention, and the scope of the invention should be limited only in accordance with the following claims.

I claim:
1. A carrier for transporting a motorcycle or the like on a larger vehicle such as an automobile or truck comprising:
    structural means adapted to be rigidly fixed to the frame of the larger vehicle near the rear thereof;
    an elongate cylindrical member connected to the structural means and cantilevered rearwardly therefrom substantially parallel to the length of the larger vehicle;
    an elongate upright channel member of U-shaped cross-sectional configuration connected to the rear end of the cylindrical member and disposed behind the large vehicle substantially perpendicular to the cylindrical member, said elongate channel having upturned portions at each of its ends, and being mounted for pivotal movement about the cylindrical member relative to said structural means between a first inclined loading position in which one end of the channel is juxtaposed the ground, and a second inclined loading position in which the other end of the channel is juxtaposed the ground; and,
    a pair of elongate stop members connected to the structural means, and extending rearwardly therefrom on opposite sides of the cylindrical member, said stop members each being independently slideable rearwardly and forwardly relative to the support means between a release position out of the path of the channel, and a stop position in the path of the channel for limiting movement of the channel in one direction to a substantially horizontal transporting position.

2. A carrier for transporting a motorcycle or the like on a larger vehicle such as an automobile or truck in accordance with claim 1 wherein:
    the structural means has three sleeves fixed thereto, one of the sleeves pivotally receiving the cylindrical member, and the other sleeves each slideably receiving one of the stop members;
    each of the stop members has an upright member fixed thereto for stabilizing the smaller vehicle in the loaded position; and,
    locking means cooperate with the stop members and the channel member to selectively lock the channel in the transporting position.

3. Apparatus for mounting an auxiliary vehicle such as a motorcycle or the like on a relatively large transporting vehicle such as an automobile, truck or the like comprising:
    an elongate platform for carrying the auxiliary vehicle;
    means for supporting the weight of the platform and the auxiliary vehicle on the transporting vehicle with the platform disposed at one end of the transporting vehicle and extending from side-to-side thereof, said supporting means including
        means cantilevered from the frame of the transporting vehicle mounting the platform near its center on the distal end of the cantilevered pivotal mounting means for pivotal movement of the platform about an axis generally parallel to the length of the transporting vehicle and intermediate the ends of the platform between
        an inclined loading position in which one end of the platform is juxtaposed the ground, and
        a generally horizontal transporting position in which the platform clears the ground sufficiently for substantially normal driving of the transporting vehicle;

means for limiting pivotal movement of the platform in one direction to the transporting position;

selectively engageable means for retaining the platform in the transporting position, said limiting means and said selectively engageable means being disposed on opposite sides of the pivotal mounting means;

the means for limiting pivotal movement being selectively releasable for pivoting the platform to an alternate inclined loading position with the opposite end adjacent the ground; and the selectively engageable retaining means including means for selectively limiting pivotal movement of the platform in the direction opposite said one direction so that the auxiliary vehicle can be loaded from either side.

References Cited

UNITED STATES PATENTS

| | | | |
|---|---|---|---|
| 1,527,901 | 2/1925 | Munday | 214—1 |
| 2,661,108 | 12/1953 | Horn et al. | 214—506 |
| 2,733,822 | 2/1956 | Woodard | 214—701 X |
| 2,815,872 | 12/1957 | Graham | 214—16.1 |
| 3,176,903 | 4/1965 | Farley | 224—42.03 |
| 3,251,520 | 5/1966 | Van Dyke et al. | 224—42.21 X |

HUGO O. SCHULZ, *Primary Examiner.*

GERALD M. FORLENZA, *Examiner.*

F. E. WERNER, *Assistant Examiner.*